Patented Sept. 1, 1925.

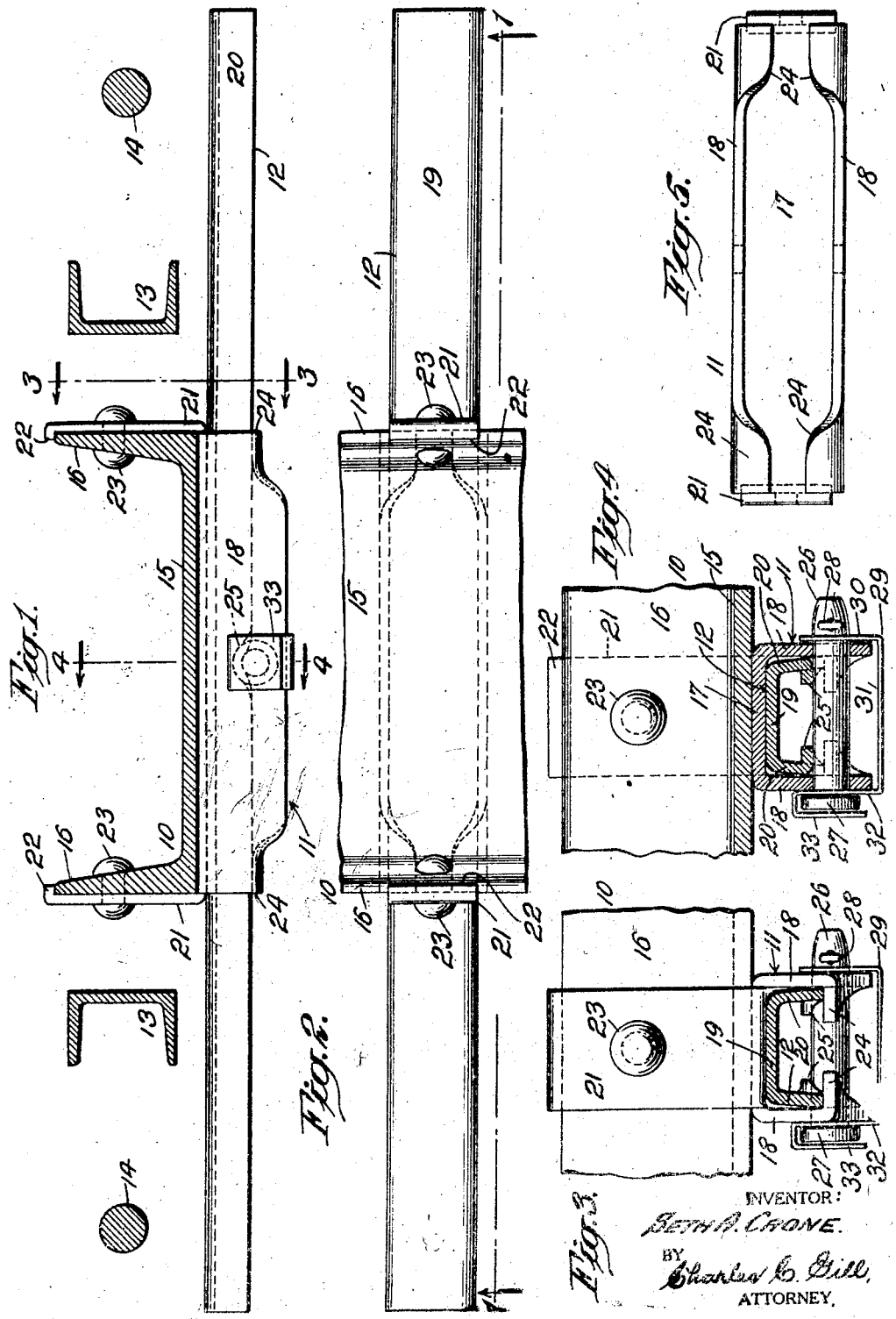

1,552,048

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

EMERGENCY SAFETY SUPPORT FOR BRAKE BEAMS.

Application filed December 20, 1924. Serial No. 757,126.

*To all whom it may concern:*

Be it known that I, SETH A. CRONE, a citizen of the United States, and a resident of East Orange, in the county of Essex and State of New Jersey, have invented certain new and useful Improvements in Emergency Safety Supports for Brake Beams, of which the following is a specification.

The invention pertains to railway brake beams, and particularly to novel auxiliary or emergency supporting bars extending below and to receive the brake beams in the event that said beams should become detached from their hangings, one purpose of the invention being to prevent, in case of accident, the brake beams from falling under the wheels, derailment being thus avoided.

A further feature of the invention resides in the means I have provided for securing the auxiliary or emergency bars and suspending the same from the usual or any suitable form of spring plank, these means being adapted to very firmly clamp the auxiliary emergency bars and also, when necessary, to permit the convenient removal of said bars in a speedy and convenient manner.

In carrying out my invention I secure a novel form of inverted channel-like wrought metal bracket against the bottom of the spring plank by means of integral hanger members engaging the opposite vertical faces of the spring plank and riveted to the flanges of said plank, there being no rivets extending through the bottom of the spring plank for securing the aforesaid bracket, and I mount the emergency bars within said brackets, there being a bracket at each side of the car truck, and finally lock the bars within the brackets by means of removable transverse pins which extend between the sides of the bracket and engage a transverse recess formed in the bottom of said bars, said pins, when in position, preventing the bars from having endwise movement and binding the bars against the bottom surface of the top of the bracket.

The invention will be fully understood from the detailed description hereinafter presented, reference being had to the accompanying drawings, in which:

Fig. 1 is a vertical longitudinal section through a portion of a car truck equipped with the features of my invention, the section being on the dotted line 1—1 of Fig. 2;

Fig. 2 is a top view, partly broken away, of the same;

Fig. 3 is a vertical transverse section, through a portion of the same, taken on the dotted line 3—3 of Fig. 1;

Fig. 4 is a like view, the section being taken on the dotted line 4—4 of Fig. 1, and Fig. 5 is a detached bottom view of the supporting bracket for the emergency bar.

In the drawings, 10 designates a conventional form of spring plank, 11 the channel-like supporting bracket of my invention, and 12 the auxiliary or emergency bar held in said support or bracket, it being understood that there is a bracket 11 and an auxiliary or emergency bar 12 at each side of the truck, these bars being below the end portions of the brake beams, which I indicate in section in Fig. 1, 13 denoting the compression member of the beam, and 14 the truss rod or tension member thereof.

The spring plank 10 comprises a bottom 15 and vertical flanges 16, as usual. The supporting bracket 11 is formed of wrought metal and is of inverted channel form, having a top 17 which extends transversely below and against the bottom of the spring plank and side members or flanges 18 which are spaced apart and are parallel with each other and receive between them the emergency bar 12, which may be of any suitable cross-section, but by preference is of inverted channel form having a top member 19 and depending side flanges 20, said top member 19 being against the lower surface of the top of the bracket 11 and said side flanges 20 fitting with reasonable snugness between the members 18 of said bracket. The supporting bracket 11 is formed integrally with end members or straps 21 which initially constitute extensions of the top member 17 of the bracket and are then bent vertically to form the members 21 which closely engage the flat outer sides of the flanges 16 of the spring plank and are bent at their extreme outer ends, as at 22, to hook over and engage the upper edges of said flanges 16, as shown in Fig. 1. The end members or hangers 21 are secured to the flanges 16 of the spring plank by means of rivets 23. The end members 21 are of such length that when secured to the flanges 16 of the spring plank in the manner described, they bind the upper surface or top of the supporting bracket 11 firmly against the bottom of the spring plank, and one purpose of the end members or hangers 21 is to permit the securing of the bracket or support 11 to the spring plank without the use of rivets extending through the bottom of the spring plank and the top of the bracket or support. I have in many instances omitted the end members or hangers 21 and riveted the bracket or support 11 to the bottom of the spring plank, but there are instances in which it is difficult, for want of space, to rivet the bracket or support 11 directly to the bottom of the spring plank, and hence I have provided the end members 21 integrally with the bracket or support and rivet the same to the flanges 16 of the spring plank, thus avoiding the necessity of riveting the bracket or support directly to the bottom of the spring plank. The upper hook ends 22 of the end members 21 aid in the security of the connection of the bracket or support 11 with the spring plank, and the rivets 23 cooperate with the hook members 22 in affording a secure connection of the brackets or supports 11 with the spring plank.

The end portions of the sides 18 of the bracket or support 11 are flanged inwardly toward each other to form seats 24 for the lower side edges of the bar 12, these seats being so positioned that they snugly receive the bar 12 and hold said bar with sufficient rigidity against the lower surface of the top 17 of the bracket or support 11. At the central portion of the bar 12 the depending flanges 20 thereof are recessed upwardly and flanged inwardly, as at 25, these recesses being on a higher plane than the tops of the seat flanges 24 formed on the bracket, and I secure the bar 12 against endwise movement while within the bracket or support 11 by means of a transverse pin 26 which extends through holes in the sides 18 of the bracket or support 11 and through the recesses 25 formed in the edges of the bar 12, as shown in Figs. 1 and 4. The pin 26 has a drive-fit against the bar 12, and hence when in position said pin serves to lock the bar 12 against endwise movement along the bracket or support 12, but when said pin 26 is removed the bar 12 may be slid endwise into or from the bracket or support 11. The pin 26 is a plain round pin having a tapered forward end and head 27 on its other end, and preferably the pin 26 is secured in position by means of a cotter-key 28 and also by means of a pin retaining lock 29 which will prevent the loss of the pin in case the cotter key 28 should become broken or detached or be inadvertently omitted. The lock 29 is formed from a strip of sheet steel and has an end member 30 having a hole through which the pin 26 passes, a bottom member 31 extending across and below the bracket or support 11, an end member 32 which extends upwardly along one side 18 of said bracket or support and contains a hole through which the pin 26 passes, and a downwardly return bent end member 33 which extends across the face of the head of the pin 27. It will be obvious that the lock 29 will retain the pin 26 in position in the absence of the cotter key 28.

The bracket 11 affords a very durable and efficient support for the safety-bar 12 and by having the integral end members or straps 21 said bracket may be conveniently secured to the spring plank, without any necessity of directly riveting the bracket to the bottom of the spring plank.

In my pending application for Letters Patent filed September 6, 1924, Serial No. 736,202, I disclose a supporting bracket which is substantially the same as the bracket 11 of this application with the exception that the bracket shown in said pending application is directly riveted to the bottom of the spring plank and does not possess the end members 21 of this application.

The method of employing the invention will be understood without additional explanation.

The invention is not limited to all the details of form and construction shown and described, these details being capable of modification in some respects within the scope of the appended claims.

What I claim as my invention and desire to secure by Letters Patent, is—

1. In a car-truck having a spring plank and an inside hung brake beam, auxiliary or emergency safety bars extending longitudinally below and normally free of the end portions of the beam, and means detachably supporting said bars from the spring plank, comprising inverted channel brackets receiving and supporting said bars, and transverse pins extending through the sides of said brackets and engaging said bars for locking said bars against endwise movement, said brackets having integral end members which extend vertically against and are riveted to the front and rear faces of said spring plank.

2. In a car-truck having a spring plank and an inside hung brake beam, auxiliary or emergency safety bars extending longitudinally below and normally free of the end portions of the beam, and means detachably supporting said bars from the spring plank, comprising inverted channel brackets receiving and supporting said bars, and transverse pins extending through the sides of said brackets and engaging said bars for locking said bars against endwise movement, said brackets having integral end members which extend vertically against the front and rear faces of the spring plank and at their upper ends are bent over and engage the upper front and rear edges of said spring plank, said end members being riveted to the spring plank.

3. In a car-truck having a spring plank and inside hung brake beams, auxiliary or emergency safety-bars extending longitudinally below and normally free of the beams, and means detachably supporting said bars from the spring plank, comprising inverted channel brackets receiving and supporting said bars, and means for locking said bars against endwise movement in said brackets, said brackets having integral end members which extend vertically against and are riveted to the front and rear faces of said spring plank.

4. In a car-truck having a spring plank and inside hung brake beams, auxiliary or emergency safety-bars extending longitudinally below and normally free of the beams, and means detachably supporting said bars from the spring plank, comprising inverted channel brackets receiving and supporting said bars, and means for locking said bars against endwise movement in said brackets, said brackets having integral end members which extend vertically against the front and rear faces of the spring plank and at their upper ends are bent over and engage the upper front and rear edges of said spring plank, said end members being riveted to the spring plank.

5. In a car-truck having a spring plank and inside hung brake beams, auxiliary or emergency safety-bars extending longitudinally below and normally free of the beams, and means detachably supporting said bars from the spring plank, comprising inverted channel brackets, portions of whose depending side members are flanged inwardly to provide seats for said bars, and transverse pins extending through said side members and engaging said bars for locking the same against endwise movement, said brackets having end members which extend vertically against and are riveted to the front and rear faces of said spring plank.

6. In a car-truck having a spring plank and inside hung brake beams, auxiliary or emergency safety-bars extending longitudinally below and normally free of the beams, and means detachably supporting said bars from the spring plank, comprising inverted channel brackets, portions of whose depending side members are flanged inwardly to provide seats for said bars, and transverse pins extending through said side members and engaging said bars for locking the same against endwise movement, said brackets having end members which extend vertically against the front and rear faces of the spring plank and at their upper ends are bent over and engage the upper front and rear edges of said spring plank, said end members being riveted to the spring plank.

Signed at New York city, in the county of New York, and State of New York, this 15th day of December A. D. 1924.

SETH A. CRONE.